(12) United States Patent
Mallela et al.

(10) Patent No.: US 10,374,734 B1
(45) Date of Patent: Aug. 6, 2019

(54) MULTI-TIER TIME-SYNCHRONIZATION ARCHITECTURE

(71) Applicant: Altera Corporation, San Jose, CA (US)

(72) Inventors: Sita Rama Chandrasekhar Mallela, Tanjung Bungah (MY); Seng Kuan Yeow, Butterworth (MY)

(73) Assignee: ALTERA CORPORATION, San Jose, CA (US)

( * ) Notice: Subject to any disclaimer, the term of this patent is extended or adjusted under 35 U.S.C. 154(b) by 577 days.

(21) Appl. No.: 15/087,949

(22) Filed: Mar. 31, 2016

(51) Int. Cl.
*H04J 3/06* (2006.01)
*H04L 12/26* (2006.01)
*H04L 29/08* (2006.01)

(52) U.S. Cl.
CPC .......... *H04J 3/0661* (2013.01); *H04L 69/324* (2013.01)

(58) Field of Classification Search
CPC ......... H04J 3/0661; H04J 3/0667; H04L 1/00; H04L 1/0061; H04L 43/106
USPC .................................................. 370/508, 509
See application file for complete search history.

(56) References Cited

U.S. PATENT DOCUMENTS

| 2003/0184347 A1* | 10/2003 | Haroun | ............... G06F 1/08 327/99 |
| 2015/0139251 A1* | 5/2015 | Tzeng | ............... H04J 3/0661 370/503 |

OTHER PUBLICATIONS

Altera Corporation. AN-739 Altera 1588 System Solution, Application note, Jan. 28, 2016, pp. 1-45, US.

* cited by examiner

*Primary Examiner* — Melvin C Marcelo
*Assistant Examiner* — Natali Pascual Peguero
(74) *Attorney, Agent, or Firm* — Fletcher Yoder P.C.

(57) ABSTRACT

Devices and methods to design and use network interfaces compliant with time-synchronization protocols via a multi-tier architecture are provided. This architecture allows for independent development between circuitry related to the time-synchronization protocols and circuitry responsible for channel access, reducing redundancies in the design process.

20 Claims, 13 Drawing Sheets

MULTI-TIER TIME-SYNCHRONIZATION ARCHITECTURE

BACKGROUND

The present disclosure relates generally to a multi-tier architecture that facilitates development of Media Access Control (MAC) interfaces compliant with time-synchronization protocols such as the IEEE 1588 PTP protocol.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Networks of electronic devices in which a common communication channel is shared usually implement conflict-avoidance protocols for accessing the channel. As an example, devices compliant with IEEE 802.3 Ethernet protocols usually include a Media Access Control (MAC) layer responsible for sending, receiving and routing packets within the network according to the Media Access Control protocol. This layer may be implemented in MAC circuitry located in the network interface. Due to uncertainties inherent to the protocol, delays in the communication between two devices may change. Therefore, specialized mechanisms and methods to provide synchronization between internal clocks of electronic devices connected to the network may be employed if such synchronization is desired.

Protocols designed to provide such synchronization, such as the IEEE 1588 Precision Time Protocol (PTP), are based on an exchange of timestamps or requests between devices. As specified in these protocols, the exchange and processing of the information allow accurate measurement of communication delays and clock offsets, which can be used for synchronization between the connected devices. For accuracy in this measurement, circuitry responsible for parsing IEEE 1588 packets and generating timestamps are implemented via hardware within the network circuitry of the electronic device.

The resulting design leads to an architecture in which the IEEE 1588 circuitry development is closely tied to the MAC circuitry development. For example, IEEE 1588 protocol operations are carried out at the data path width of the internal MAC circuitry, which can be, for example, 8 bit, 32 bit, 54 bit, 128 bit or 256 bit. As a result, changes in the design of the MAC circuitry may involve a redesign of the circuitry responsible for IEEE 1588 operations. Similarly, changes to the IEEE 1588 specification may involve a redesign of each of the existing versions of MAC circuitry. As a result, significant inefficiencies in resource usage, product management, validation and verification processes have been observed in the life cycle of IEEE 1588-compliant network circuitry.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to networked electronic devices compliant with a time-synchronization protocol. The devices employ network interfaces having a multi-tiered architecture in which the elements responsible for the time-synchronization protocol are modularly connected to the elements responsible for the access to the network. In some examples, the elements responsible for the time synchronization operate transparently. In other examples, the electronic device directly controls the elements responsible for the time synchronization. A single electronic device may incorporate several modules of network circuitry.

In another example, network circuitry employing the 3-tier architecture is provided. The interface may be compliant with networking standards such as the IEEE 802.3 standard. The interface may also be compliant with time synchronization standards such as the IEEE 1588. The design of the network circuitry reduces redundancies in the design cycle of the product via re-utilization of validated subparts.

This disclosure also discusses methods to improve the development of a 3-tier architecture network circuitry employing modular design. This is achieved by independent development of the separate circuitry, enabled by the 3-tier architecture.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Figure 1:
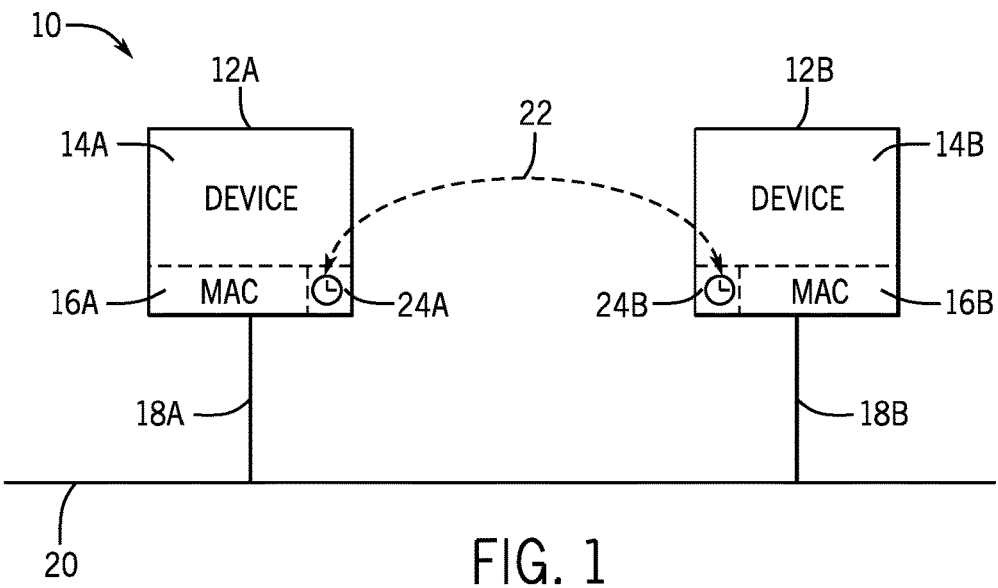
FIG. 1 is a diagram for the communication of two electronic devices connected through a common-channel network, in accordance with an embodiment.

Implementations of networks of electronic devices through a common-channel network, such as the IEEE 802.3 Ethernet protocol, usually employ specialized circuitry to access the channel. The diagram in FIG. 1 illustrates an example of a network 10 through which electronic devices 12A and 12B can establish communication using a common channel 20. Examples of the type of electronic devices found in some implementations include but are not limited to a general purpose computer, a System-on-Chip, a network router, switch or relay, a hardware controller, a sensor, etc. The electronic device 12A may have data utilization circuitry 14A responsible for the performance of some of the device functions. When one of the functions involve communication between the electronic device 12A and device 12B (or any other device in the network) the data utilization circuitry 14A uses a network circuitry 16A, a specialized electronic circuitry that allows the electronic device 12A to access the common channel 20. The network circuitry 16A is responsible for generating, receiving and rerouting packets compliant with the MAC network protocol (e.g., as specified in the IEEE 802.3 Ethernet standard). Furthermore, the electronic device 12A may also have a clock 24A providing Time-of-Day (ToD) information, which may be used by the data utilization circuitry 14A in the performance of its functions. The device 12B also includes network circuitry 16B, a clock 24B and data utilization circuitry 14B. Note that the data utilization circuitry 14A and 14B may be distinct from each other. As an example, electronic device 12A may be a telemetry monitor and electronic device 12B may be a sensor. In this example, the data utilization circuitry 14A may be a general purpose computer and the data utilization circuitry 14B may be circuitry containing sensor and data acquisition electronics. The data utilization circuitry 14A and/or 14B may include circuitry corresponding to a Programmable Logic Device (PLD) or a Field Programmable Gate Array (FPGA), a computer, or application-specific hardware, such as an application-specific integrated circuit (ASIC).

In some applications, a synchronization 22 between clocks 24A and 24B may be desired for proper function of electronic devices 12A and 12B. Since the communication delays in a packet travelling from network circuitry 16A and 16B may be random, techniques to measure that delay may be employed in the calculation of the offset between the ToD values in clocks 24A and 24B.

Figure 2:
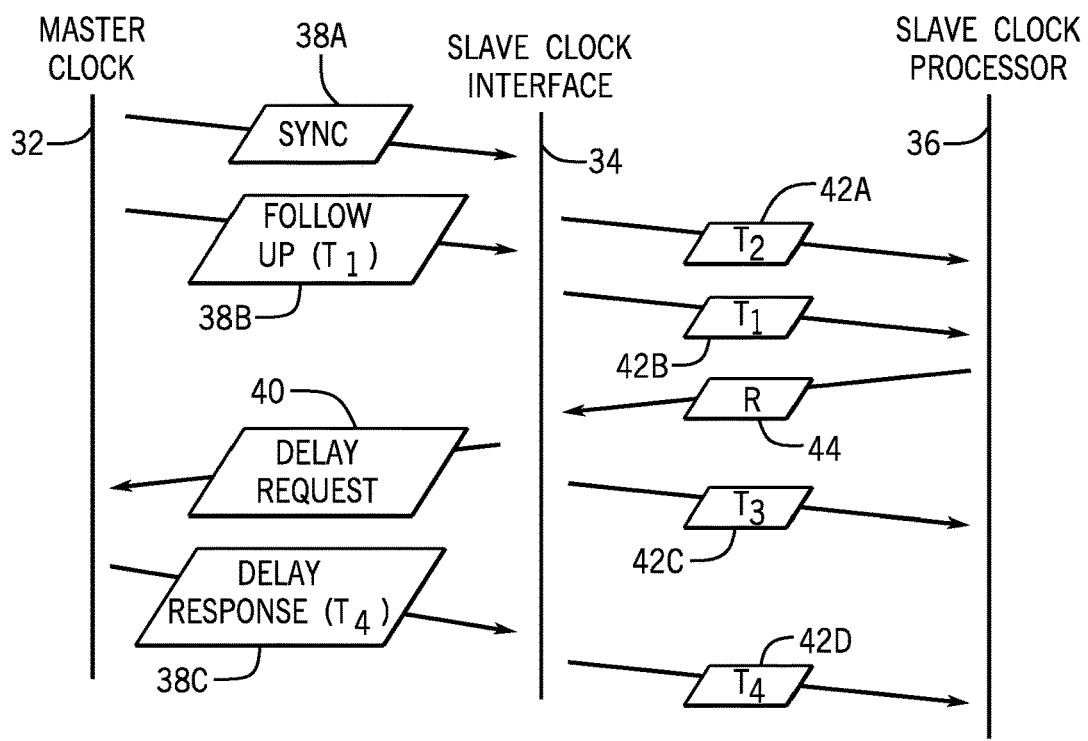
FIG. 2 is a time sequence diagram for synchronization as specified in IEEE 1588 between a master and a slave clock, in accordance with an embodiment.

A precision time protocol (PTP) defined in the IEEE 1588 protocol specifies a method for such synchronization between electronic devices in a network. Although this application describes time-synchronization according to the IEEE 1588 protocol by way of example, it should be appreciated that the modular architecture of this disclosure may employ any suitable time-synchronization protocol, and should not be understood to be limited to the IEEE 1588 protocol. A sequence diagram 30 implementing aspects of the IEEE 1588 protocol is illustrated in FIG. 2. In accordance with the protocol, a master clock 32 communicates with a slave clock by sending a "sync" message 38A to the slave clock interface 34. The slave clock interface 34 sends to the slave clock processor 36 the timestamp $t_2$ 42 corresponding to the Slave Clock ToD when the "sync" message 38A was received. The master clock 32 also sends a "follow up" message 38B carrying a timestamp $t_1$ of the Master Clock ToD when the "sync" message 38A was sent. The content of the "follow up" message 38B, timestamp $t_1$ 42B, is forwarded by the slave clock interface 34 to the slave clock processor 36. At any time, the slave clock processor 36 may send a request 44 to the slave clock interface 34 for a delay. The slave clock interface 34 sends a delay request 40 to the master clock 32 and may send the corresponding timestamp $t_3$ 42C to the slave clock processor 36. Finally, the master clock 32 sends a "delay response" message 38C to the slave clock interface 34, which forwards the content, timestamp $t_4$ 42D, to the slave clock processor 36. The four timestamps 42A-D, allow the slave clock processor 36 to calculate the offset between the master and the slave clocks and synchronize the clock accordingly, through the formula $o=(t_2-t_1+t_3-t_4)/2$.

Figure 3:
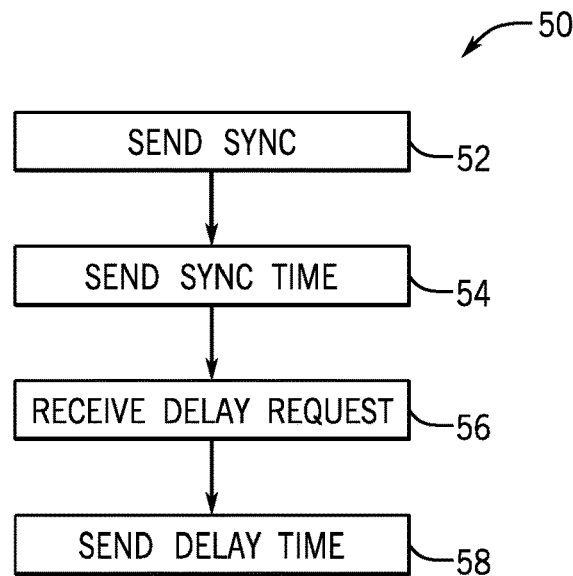
FIG. 3 is a flow chart of a method for a master clock to synchronize slave clocks in the network, in accordance with an embodiment.
Figure 4:
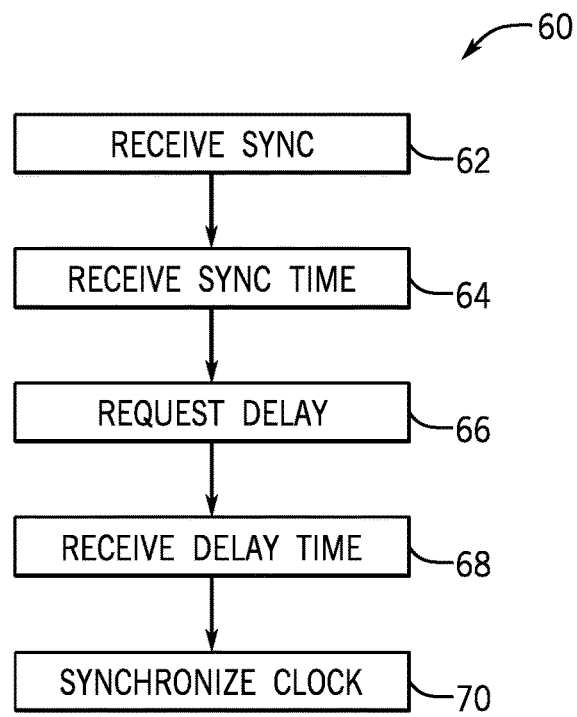
FIG. 4 is a flow chart of a method for a slave clock to be synchronized by a master clock in the network, in accordance with an embodiment.

With the foregoing in mind, FIG. 3 includes flowchart 50 for an implementation of the sequence diagram 30 within a master clock in accordance with an embodiment. The master clock first sends a "sync" message 52, then sends a timestamp of the "sync" message 54 to a slave clock. Upon receiving a "request delay" message 56, the master clock sends a "delay" timestamp 58 to the slave clock. The flowchart 60 in FIG. 4 represents an implementation of the sequence diagram 30 in a slave clock, in accordance with an embodiment. The slave clock receives a "sync" message 62 and a timestamp of the sync message 64 from a master clock. The slave clock sends a "request delay message" 66 and receive a delay timestamp 68 to the master clock. Thus, with the received timestamps, the slave clock synchronizes itself with the master clock.

The synchronization methods described above employ exchange of packets that are timestamped at the moment of transmission or reception by a network device, as specified by the IEEE 1588 protocol. For improved accuracy, the generation of timestamps and parsing of data packets to identify IEEE 1588 commands may be implemented within the logic of the network circuitry. Note that the logic of the network circuitry also implements instructions responsible for reception, transmission and redirection of MAC packets, in accordance with the MAC protocol. Embodiments of the present disclosure envisage an architecture in which the IEEE 1588-specific logic that is modularly connected to the MAC-specific logic, preserving the accuracy of the synchronization method while allowing independent design of the two specific logical modules.

Figure 5:
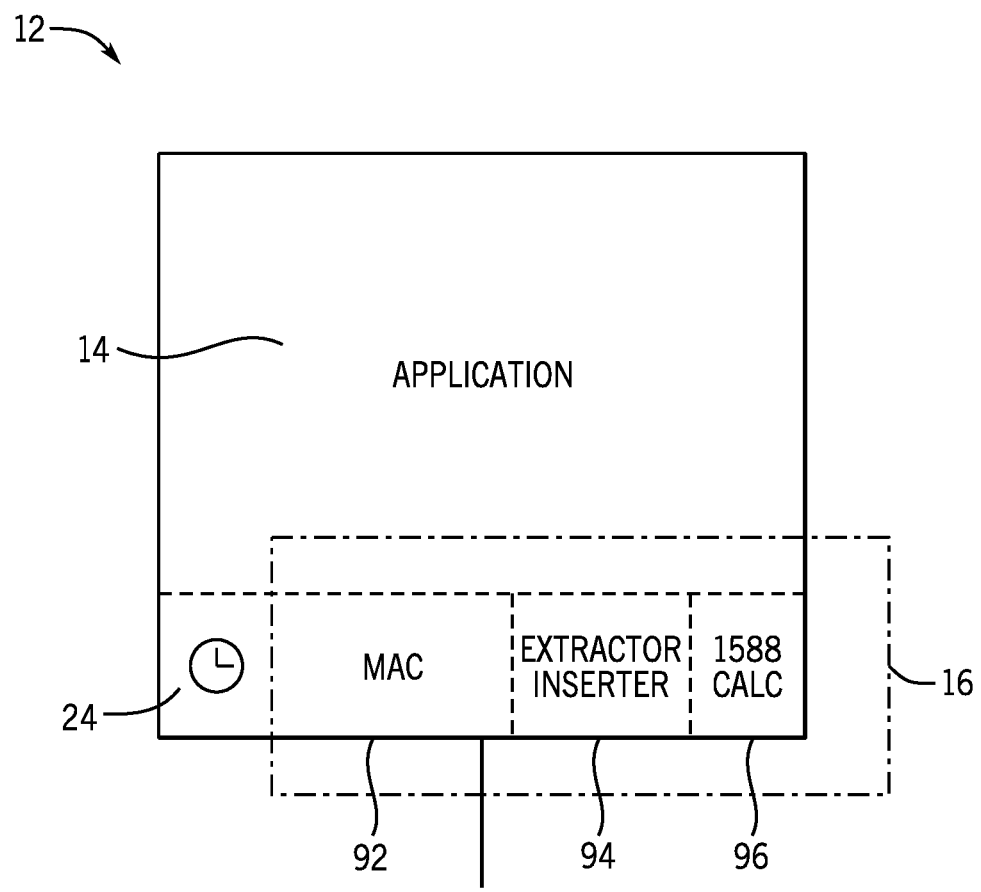
FIG. 5 is a diagram of the architecture of an electronic device containing a 3-tier IEEE 1588-compliant MAC interface, in accordance with an embodiment.

The diagram in FIG. 5 shows an implementation of a 3-tier network circuitry 16 in an electronic device 12. The device includes circuitry 14, a clock 24 and an IEEE 1588-compliant network circuitry 16. The network circuitry 16 includes MAC circuitry 92 responsible for implementation of the MAC protocol, extractor/inserter circuitry 94 which is datawidth-dependent adaptor circuitry, and an electric circuit responsible for IEEE 1588 core operations, and time-synchronization circuitry illustrated as 1588_calc circuitry 96A, which is responsible for timestamping and processing related to the IEEE 1588 protocol. The datawidth-dependent adaptor circuitry, extractor/inserter circuitry 94, is responsible for mediating circuitry 92 and 96A when desired.

Figure 6:
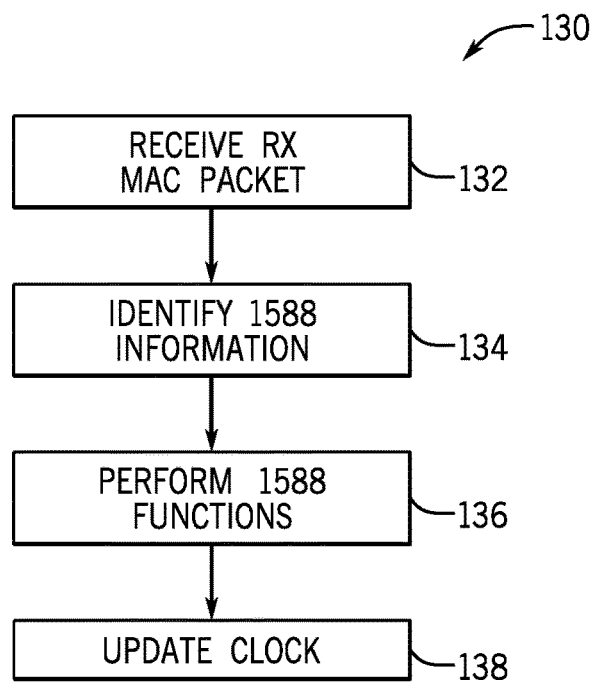
FIG. 6 is a flow chart of a method for reception of MAC packets for a 3-tier IEEE 1588-compliant MAC interface, in accordance with an embodiment.
Figure 7:
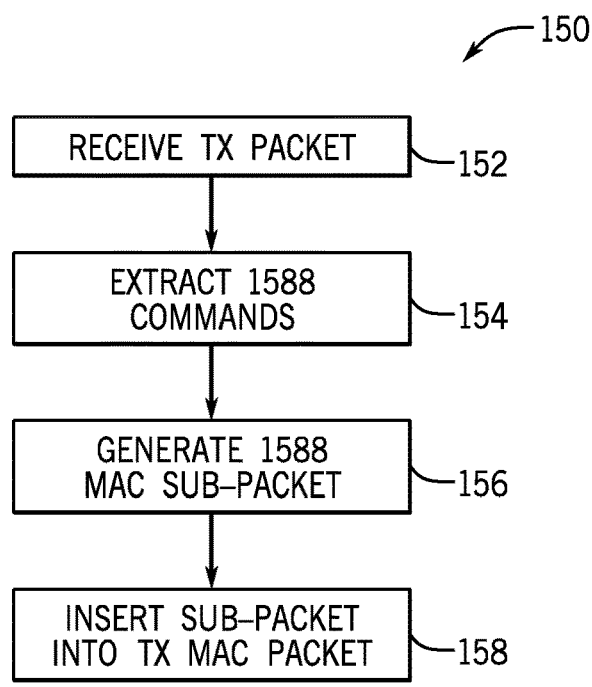
FIG. 7 is a flow chart of a method for transmission of MAC packets for a 3-tier IEEE 1588-compliant MAC interface, in accordance with an embodiment.

With the foregoing in mind, flow charts 130 in FIGS. 6 and 150 in FIG. 7 describe methods for modular operation of a 3-tier IEEE-1588 compliant MAC layer circuitry, as described above. The flow chart 130 in FIG. 6 describes a method of operation for the reception of a MAC packet. The MAC circuitry and the 1588_calc circuitry receive an RX MAC packet received from the network (block 132). The 1588_calc circuitry may identify elements of the packet specific to the IEEE 1588 protocol (block 134). Based on the contents of the packet and the specifications of the IEEE 1588 protocol, the 1588_calc circuitry may record a ToD for reception of the packet based on a local clock or extract ToD data from the packet (block 136). If desired, the electronic device may synchronize its clock (block 138).

The flow chart 150 in FIG. 7 describes a method of operation for transmission of MAC packet. The MAC circuitry receives a packet to be transmitted (block 152). An Extractor component in the Extractor/Inserter circuitry parses the outgoing packet seeking control instructions for the operation of the 1588_calc circuitry (block 154). Based on these control instructions, the 1588_calc circuitry processes these commands and generates IEEE 1588 information to be sent. The Inserter component generates an appropriate MAC sub-packet based in part on the commands and the data (block 156). Finally, the Inserter component may insert the sub-packet into the TX MAC packet taking into account the datapath width specific to the MAC circuitry and the offsets of the IEEE 1588 data obtained from the TX packet (block 158). This allows the 1588_calc circuitry to be independent of the datapath-dependent components of the system architecture.

Figure 8:
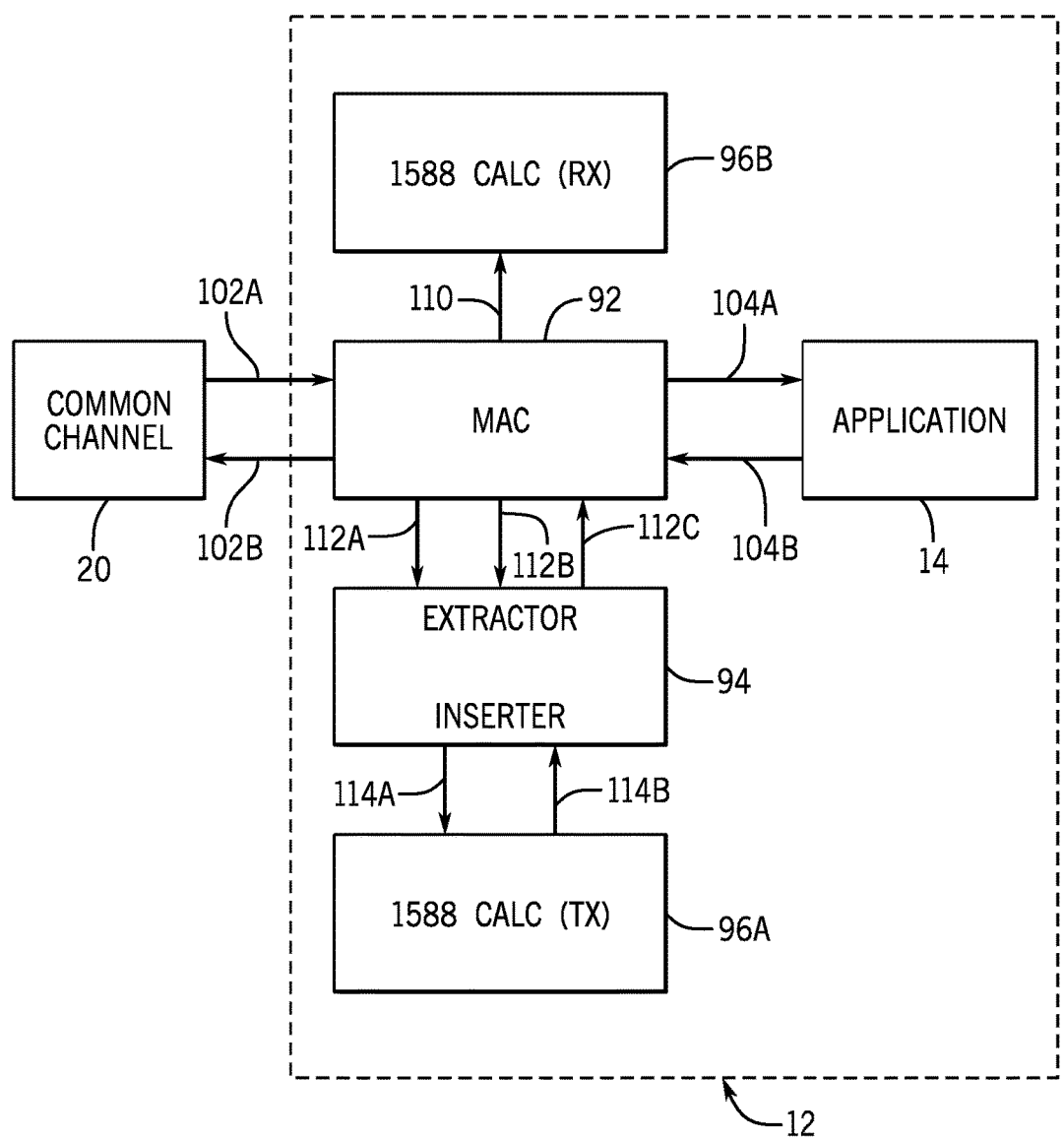
FIG. 8 is a diagram of the data flow of an electronic device containing a 3-tier IEEE 1588-compliant MAC interface, in accordance with an embodiment.

With the foregoing in mind, a block diagram in FIG. 8 illustrates the flow of the packets and control instructions through an implementation of a electronic device 12 with a 3-tier architecture as described above, compliant with the IEEE 1588 protocol. When the MAC circuitry 92 receives a packet 102A from the common channel 20, this message is forwarded 110 to the 1588_calc (RX) circuitry 96B configured to receive data. The 1588_calc (RX) circuitry 96B identifies the presence of IEEE 1588 commands and processes them accordingly producing a timestamp for the received packet if desired. In some implementations, the 1588_calc (RX) circuitry 96B may synchronize the system clock. The MAC circuitry 92 also processes the received packet 102A in accordance with the MAC protocol specifications and may send the processed message 104A to the circuitry 14.

When the electronic device 12 is to send a packet to another device in the network, the circuitry 14 sends a packet 104B to the network circuitry 16. The message is forwarded 112A to the extractor/inserter circuitry 94 which extracts IEEE 1588 contents, offsets and control instructions specific to the 1588_calc circuitry. The extracted information is forwarded 114A to the 1588_calc circuitry 96A, which is configured to process transmitted (TX) data. The 1588_calc (TX) circuitry 96A produces data 114B to be inserted in the outgoing packet, containing IEEE 1588 information such as Time-of-Day (ToD) and Correction Fields (CF) as well as checksums ChkA based on the updated data. The extractor/inserter circuitry 94 edits an outgoing packet 112B based on the received data 114B and the previously extracted offsets. The extractor/inserter circuitry 94 returns the modified packet 112C to the network circuitry 16. The network circuitry 16 finalizes processing and sends the MAC compliant packet 102B to the common channel 20. The 1588_calc (TX) circuitry 96A and the 1588_calc (RX) circuitry 96B may employ a symmetrical architecture, allowing a common 1588_calc design to be used in both, the difference being whether the 1588_calc circuitry operates on outgoing (TX) or incoming (RX) packets.

Figure 9:
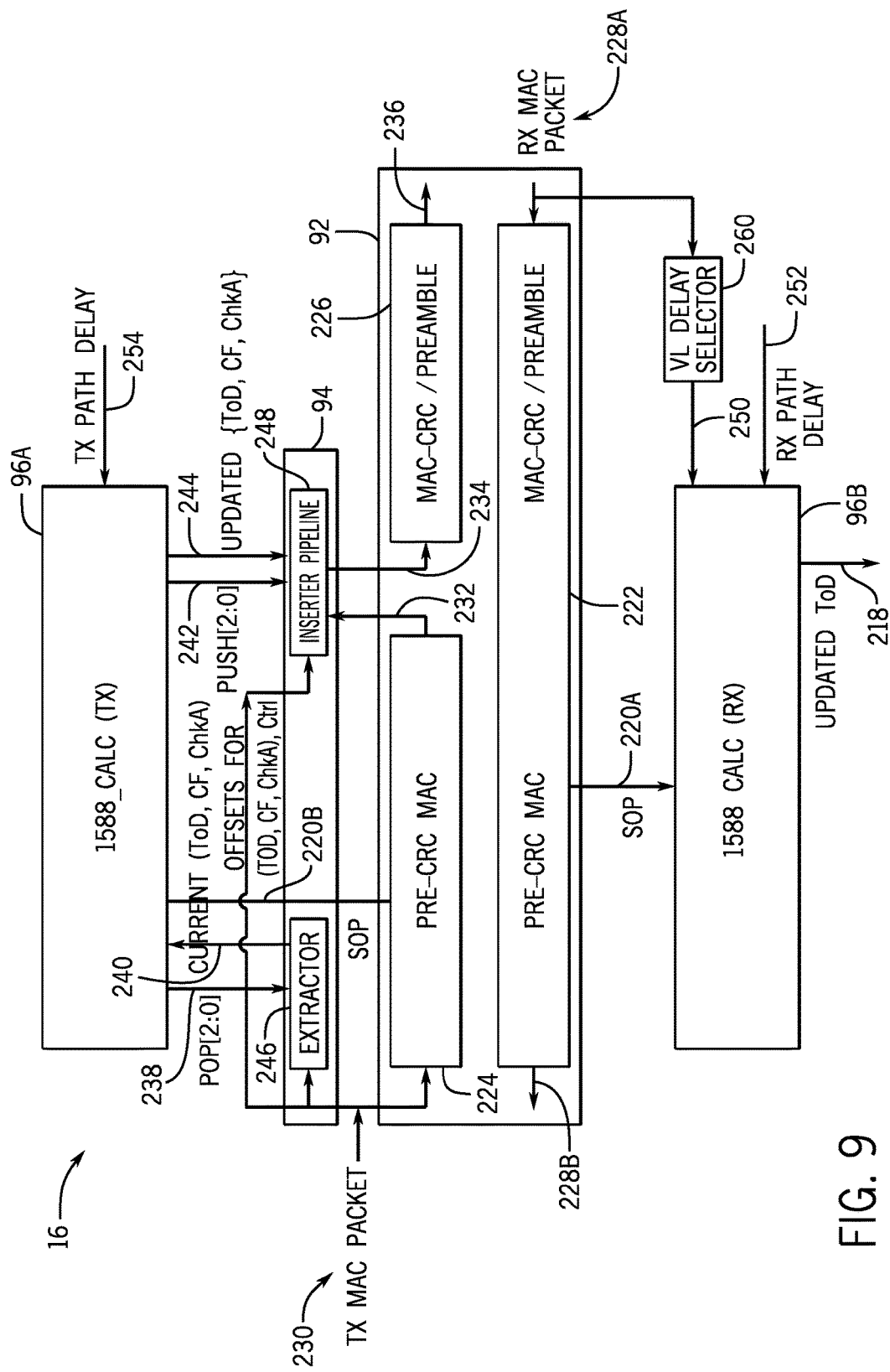
FIG. 9 is a diagram of a 3-tier IEEE 1588-compliant MAC interface, in accordance with an embodiment.

FIG. 9 illustrates a logic diagram of an implementation of an IEEE 1588-compliant network circuitry. An RX MAC packet 228A is retrieved from the network common-channel network by a RX MAC pipeline 222 within the MAC circuitry 92. The processed RX MAC packet 228B may be sent to data utilization circuitry (not shown). The RX MAC packet 228A is also routed through a Variable Delay Selector 260 to 1588_calc (RX) circuitry 96B. The 1588_calc (RX) circuitry 96B also receives a Start of Packet (SoP) signal 220A from the RX MAC pipeline 222 to account for latency in the RX MAC pipeline 222. Based on the IEEE 1588-specific commands found in the RX MAC packet 228A, the 1588_calc (RX) circuitry 96B makes available a ToD 218 obtained from either the packet or from a clock in the electric device. Additional desired RX path delays 252 may be provided based on application specifications.

When data utilization circuitry generates an outgoing TX MAC packet 230 to be transmitted, the Pre-CRC MAC pipeline 224 of the MAC transmit pipeline receives the packet. An Extractor component 246 within the extractor/inserter circuitry 94 parses the signals to identify IEEE 1588 commands or requests. The extractor generates a control word based on the commands or requests identified in the outgoing TX MAC packet 230. The extractor may also obtain ToD, CF or ChkA data from the outgoing TX MAC packet 230 and make it available in internal FIFOs for processing, as detailed below. The data obtained from the extractor is made available to the 1588_calc (TX) circuitry 96A via a connection 240.

The Pre-CRC MAC pipeline 224 may send a SoP signal 220B, which triggers processing of the 1588_calc circuitry 96A at an instant that takes into account the latency of pipeline 224. Upon receiving the SoP signal 220B, the 1588_calc (TX) circuitry 96A retrieves a control instruction from the Extractor component 246 through pop requests 238. Depending on the control instruction, the 1588_calc (TX) circuitry 96A may request a Time of Day (ToD), a correction field (CF), or a checksum code (chkA) 240, as specified below. The 1588_calc (TX) circuitry 96A may provide IEEE 1588 information to the inserter 248. Depending on the control instruction, the IEEE 1588 information may include an updated ChkA, an updated CF or an appropriate ToD through a connection 244. The specific data provided will be indicated via a push signal 242.

The outgoing CRC-processed MAC packet 232 coming from the Pre-CRC MAC pipeline 224 is routed to the Inserter component 248. The inserter edits the received packet with a modified ToD, an updated CF and/or an updated chkA via connection 244 based on the push connection 242 provided by the 1588_calc (TX) 96A, or based on control instructions in the outgoing TX MAC packet 230, as detailed below. The edited packet 234 is then routed back to the MAC-CRC/Preamble pipeline 226 for addition of the protocol-specific preamble and sent to the network 236.

As mentioned above, the 1588_calc circuitry 96A and 96B may be used to produce different types of IEEE 1588 information. In some implementations, the 1588_calc circuitry may be requested to produce a ToD. Based on the desired Protocol Operation, ToD may be a timestamp obtained from the system clock or it may be the ToD extracted from MAC packet. Similarly, the 1588_calc circuitry may be expected to produce a CF in some implementations. The CF may be extracted from the packet, a previously obtained CF or may have to be calculated as the difference between the current ToD (Te) and a ToD extracted from the packet (Ti). Furthermore, calculation of the CF may use asymmetry information. The 1588_calc may, after updating CF and ToD data, produce a new checksum value ChkA. The specific calculation may be determined by the version of the IEEE 1588 protocol (v1 or v2). With the foregoing in mind, Table 1 presents a set of control instructions from the extractor/inserter circuitry to the 1588_calc circuitry, as used in some embodiments. The control word length can be increased from 6 bits if desired by changes due to new versions of the IEEE 1588 standard.

TABLE 1

CONTROL INSTRUCTIONS FROM EXTRACTOR TO 1588_CALC

| Protocol Operation | Control instruction |
| --- | --- |
| Non 1588 packet or 1588 packet with no operation | 6'b00_0000 |
| 1588 v1; insert/report ToD; don't change CF; don't update asymmetry; don't calculate ChkA. | 6'b01_1000 |
| 1588 v2; report ToD, don't change CF; don't update asymmetry; don't calculate ChkA. | 6'b01_0000 |
| 1588 v2; insert ToD, update CF; don't update asymmetry; don't calculate ChkA | 6'b01_0100 |
| 1588 v2; insert ToD; update CF; update asymmetry; don't calculate ChkA | 6'b11_0100 |
| 1588 v2; don't insert ToD, don't update CF; update asymmetry; don't calculate ChkA | 6'b10_0000 |
| 1588 v2; don't insert ToD, update CF residence delay (CF + Te − Ti) in 96b format; don't update asymmetry; don't calculate ChkA | 6'b00_0100 |
| 1588 v2; don't insert ToD, update CF residence delay and asymmetry (CF + Asymmetry + Te − Ti) in 96b format; don't calculate ChkA | 6'b10_0100 |

TABLE 1-continued

CONTROL INSTRUCTIONS FROM EXTRACTOR TO 1588_CALC

| Protocol Operation | Control instruction |
| --- | --- |
| 1588 v2; don't insert ToD, update CF residence delay (CF + Te − Ti) in 64b format; no asymmetry update; don't calculate ChkA | 6'b00_0110 |
| 1588 v2; don't insert ToD, update CF residence delay and asymmetry update (CF + Asymmetry + Te − Ti) in 64b format; don't calculate ChkA | 6'b10_0110 |
| 1588 v1; insert/report ToD; don't change CF; don't update asymmetry; calculate ChkA. | 6'b01_1001 |
| 1588 v2; report ToD, don't change CF; don't update asymmetry; calculate ChkA. | 6'b01_0001 |
| 1588 v2; insert ToD, update CF; don't update asymmetry; calculate ChkA | 6'b01_0101 |
| 1588 v2; insert ToD; update CF; update asymmetry; calculate ChkA | 6'b11_0101 |
| 1588 v2; don't insert ToD, don't update CF; update asymmetry; calculate ChkA | 6'b10_0001 |
| 1588 v2; don't insert ToD, update CF residence delay (CF + Te − Ti) in 96b format; don't update asymmetry; calculate ChkA | 6'b00_0101 |
| 1588 v2; don't insert ToD, update CF residence delay and asymmetry (CF + Asymmetry + Te − Ti) in 96b format; calculate ChkA | 6'b10_0101 |
| 1588 v2; don't insert ToD, update CF residence delay (CF + Te − Ti) in 64b format; no asymmetry update; calculate ChkA | 6'b00_0111 |
| 1588 v2; don't insert ToD, update CF residence delay and asymmetry update (CF + Asymmetry + Te − Ti) in 64b format; calculate ChkA | 6'b10_0111 |

Figure 10:
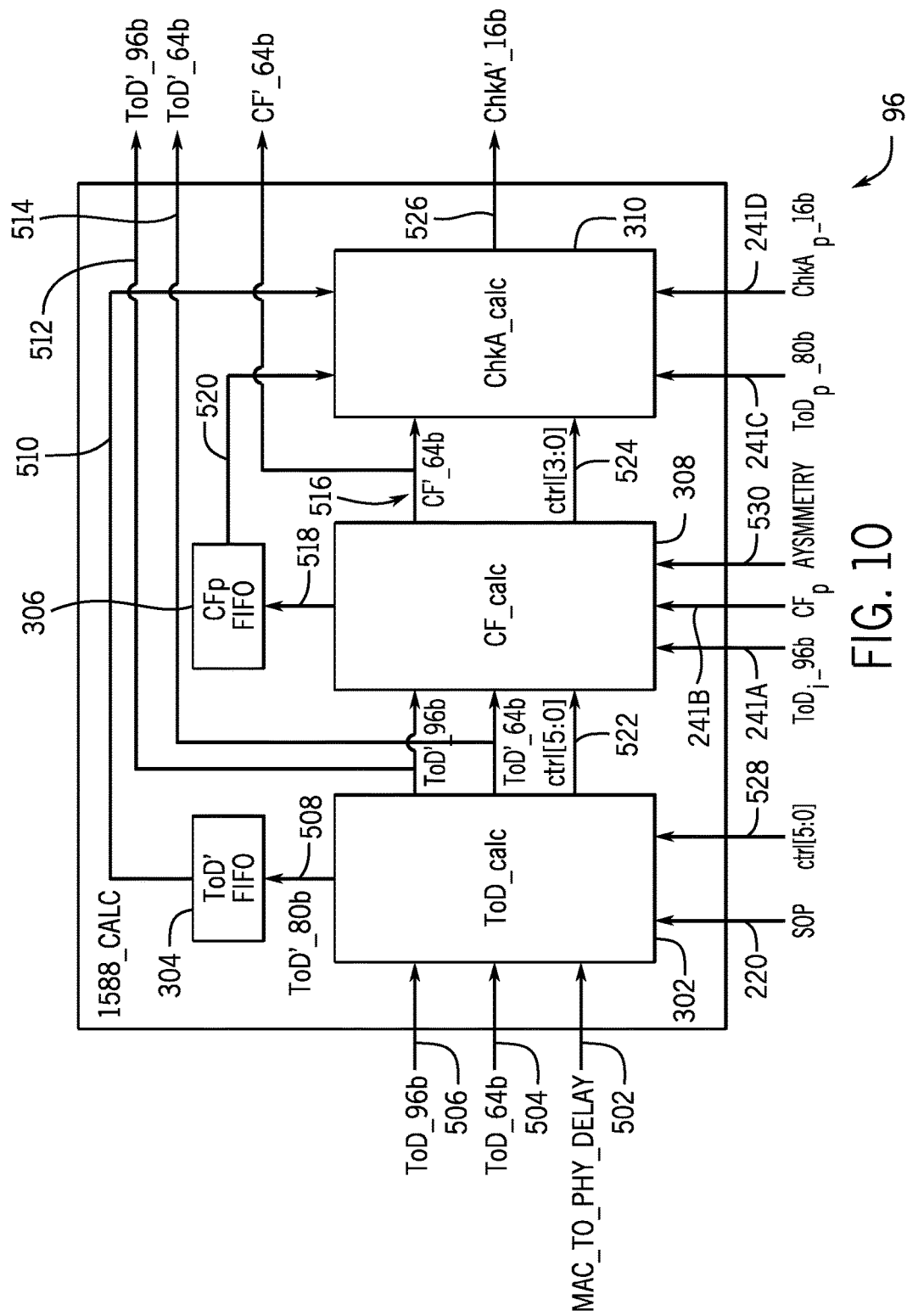
FIG. 10 is a diagram of 1588_calc circuitry, in accordance with an embodiment.

A diagram in FIG. 10 illustrates an example architecture of 1588_calc circuitry, such as circuitry 96A and 96B, in accordance with some of the implementations. This architecture may be configured to transmit or to receive MAC packets. The circuitry contain a ToD FIFO 304 and a CF FIFO 306. The circuitry also contains the ToD_calc component 302, the CF_calc component 308 and the ChkA_calc component 310. The specific action of the 1588_calc circuitry 96 may depend on the input control instruction input 528 provided by the extractor. Upon the reception of a SoP signal 220, the ToD_calc component 302 may collect a Time of Day signal either as a 96-bit signal ToD_96b 506 or as a 64-bit signal ToD_64b 504. The recorded Time of Day may be adjusted based on a delay 502 and sent as ToD_80b 508 to the ToD FIFO 304. The updated ToD is also sent to a CF_calc component 308 in the 96-bit ToD'_96b 512 or in the 64-bit ToD'_64b 514. The CF_calc component 308 may also receive the ToD in the packet 241A, and asymmetry information 530. Based on the forwarded control word 522, the CF_calc component 308 calculates a CF from the received information, as detailed above. If no CF update is requested, the CF_calc component may also produce the previous CF obtained from the MAC packet 241B. The previous CF is queued in the CF FIFO 306 through connection 518. The newly produced CF is made available to the ChkA_calc component 310 through connection 516. Finally, the ChkA_calc component 310 may calculate an updated checksum ChkA 526. For this operation, the ChkA_calc component 310 may use the ToD extracted from the packet 241C if no change took place, or the updated ToD 510 queued in the ToD FIFO 304. The ChkA_calc may also use the previous CF stored in CF FIFO 306 through connection 520, or the new CF through connection 516. If no change to the ChkA value is desired, the ChkA_calc may use the ChkA obtained from the MAC packet 241D. After processing, the 1588_calc makes available the updated ToD in 96-bit ToD'_96b 512 and in 64-bit ToD'_64b 514, the updated CF 516 and an updated checksum ChkA 526.

The 6-bit control instructions are received by the 1588_calc circuitry 96 through a control instruction input 528. The control words for the protocol operations, described in the previous Table 1, can be mapped to control ports as described in the Table 2. This mapping ensures that relevant data is handed off to the 1588_calc circuitry, thus reducing unnecessary toggling/switching and thus reducing power dissipation. The forwarded control word 522 generated in the ToD_calc component 302 is sent to the CF_calc component 308. In some implementations, the CF_calc component 308 may forward the three lower bits of the control word to the ChkA_calc component 310 through a connection 524.

TABLE 2

MAPPING OF COMMANDS 1588_CALC CONTROL PORTS

| Control port | Mapping of the extractor input |
| --- | --- |
| ctrl_extractor_to_calc[5] | tx_egress_asymmetry_update |
| ctrl_extractor_to_calc[4] | tx_egress_timestamp_request_valid/ tx_etstamp_ins_ctrl_timestamp_insert |
| ctrl_extractor_to_calc[3] | tx_etstamp_ins_ctrl_timestamp_format (1 denotes v1, 0 denotes v2) |
| ctrl_extractor_to_calc[2] | tx_etstamp_ins_ctrl_residence_time_update or tx_etstamp_ins_ctrl_timestamp_insert |
| ctrl_extractor_to_calc[1] | tx_etstamp_ins_ctrl_residence_time_calc_format (1 denotes 64 bits, 0 denotes 96 bits) |
| ctrl_extractor_to_calc[0] | tx_etstamp_ins_ctrl_checksum_correct |

The design of the 1588_calc (RX) circuitry 96B is similar to that of the 1588_calc (TX) circuitry 96A, as shown in FIG. 9. However, the IEEE 1588 specifications may not involve calculation of checksums or correction fields in the received MAC packets. Therefore, in some implementations, the 1588_calc (RX) circuitry may not include CF_calc 308, the CF FIFO 306 and the ChkA_calc 310 components, along with the related connections.

Figure 11:
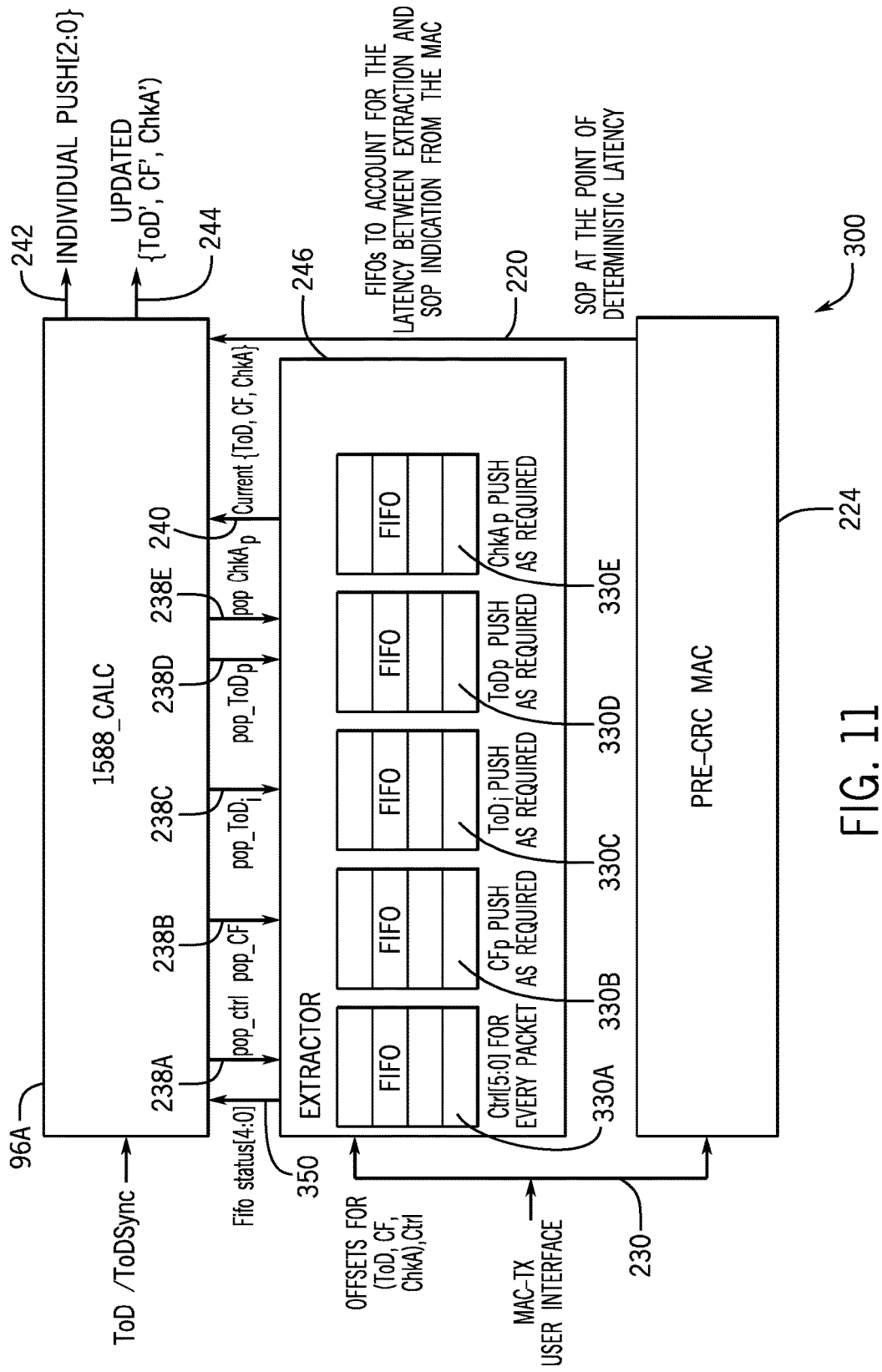
FIG. 11 is a diagram of an Extractor component and its relationship with MAC circuitry and 1588_calc circuitry, in accordance with an embodiment.

A diagram in FIG. 11 details the architecture of the extractor component 246 and its relationship with the Pre-CRC MAC pipeline 224 and the 1588_calc circuitry 96B. The extractor design includes a 6-bit FIFO control instructions FIFO 330A, a CFp FIFO 330B, a ToDi FIFO 330C that stores a ToD for correction field calculation, a ToDp FIFO 330D that stores a previous ToD, and a ChkAp FIFO 330E that stores ChkA. The control command stored in the control instructions FIFO 330A is extracted from the outgoing packet TX MAC packet 230 sent by data utilization circuitry. Similarly, the values stored in the CFp FIFO 330B, the ToDi FIFO 330C, the ToDp FIFO 330D and the ChkAp FIFO 330E may be extracted from the outgoing TX MAC packet 230, as described by the control word. Upon receiving a SoP signal from the MAC pipeline 224, the 1588_calc circuitry 96B retrieves a control command from control instructions FIFO 330A and performs the requested operations to produce updated CF, ToD and ChkA, as detailed above. The 1588_calc circuitry requests data from FIFOs 330B-E through pop request connections 238B-E, as employed by the operation being performed. The requested data is sent from the extractor component 246 to the 1588_calc circuitry 96B through connection 240.

Figure 12:
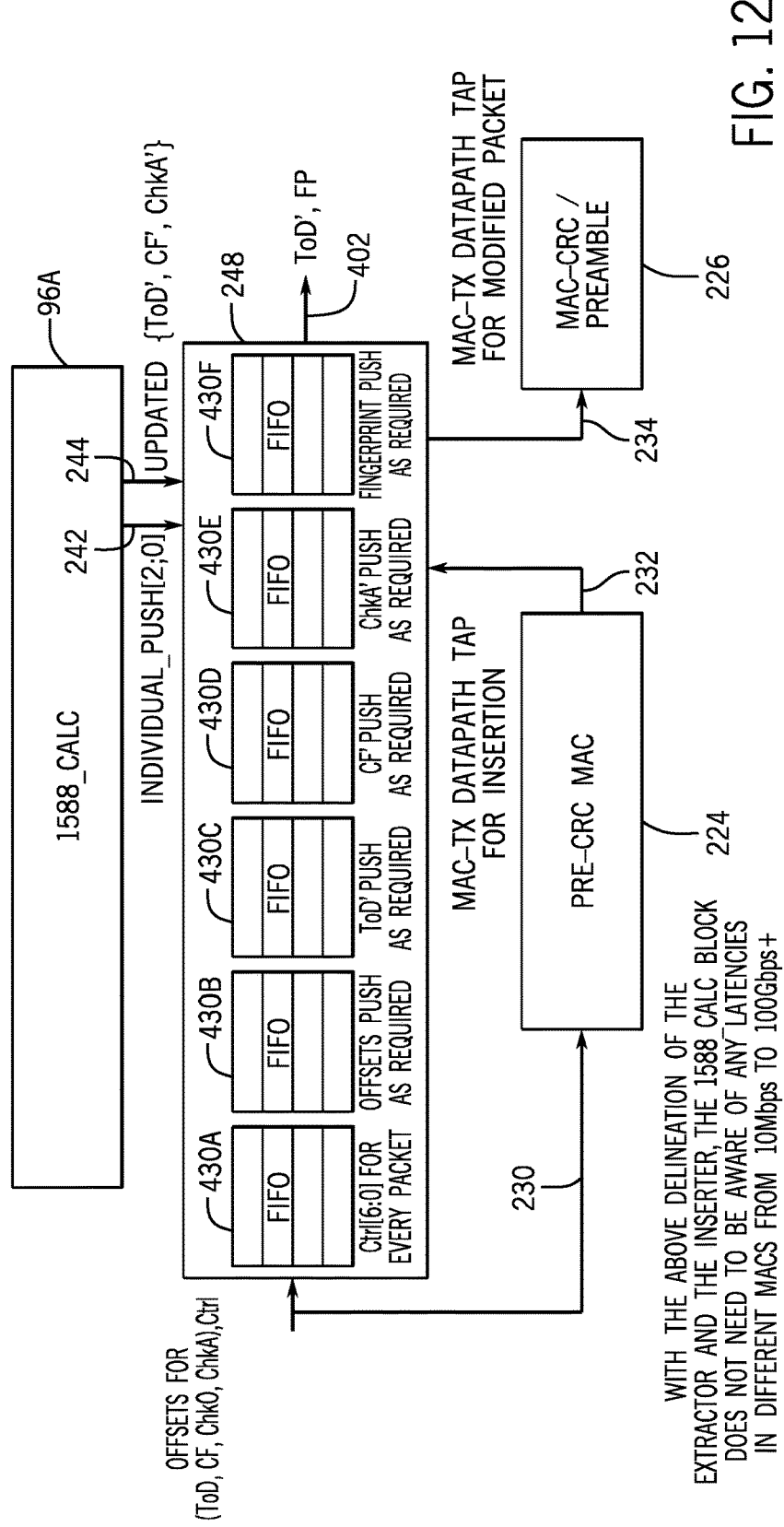
FIG. 12 is a diagram of an Inserter component and its relationship with MAC circuitry and 1588_calc circuitry, in accordance with an embodiment.

A diagram in FIG. 12 details an architecture of the inserter component 248 and its relationship with the 1588_calc circuitry (TX) 96A, the Pre-CRC MAC pipeline 224, and the MAC-CRC/Preamble pipeline 226. The inserter includes a 6-bit ctrl FIFO 430A that stores a control word. The control word is defined as described in Table 3 to ensure that the control operations for each packet in the sequence are unambiguous. These operations can be mapped to the extractor output. The inserter also has an Offset FIFO 430B, which contains information about the position of the IEEE 1588 data within the MAC packet. This information is extracted from the outgoing TX MAC packet 230. The inserter component 248 may have Time of Day FIFO 430C, a Correction Field FIFO 430D, and a Checksum FIFO 430E populated by data obtained from the 1588_calc circuitry 96B through connection 244, and pushed as indicated by the push signal 242. The inserter component 248 may have a Fingerprint FIFO 430F. As requested by the control instruction, the inserter component 248 obtains the CRC corrected TX packet 232 from the Pre-CRC MAC pipeline 224 via a first data tap, edits the updated fields based on the data stored in the FIFOs 430B-F and returns the packet 234 to the MAC-CRC/Preamble pipeline 226 via a second data tap. The inserter may also provide an updated ToD and Fingerprint via connection 402 if that information is desired by other components.

TABLE 3

MAPPING OF COMMANDS TO INSERTER

| Control port | Mapping to the inserter input |
| --- | --- |
| ctrl_user_to_inserter[5] | tx_egress_timestamp_request_valid |
| ctrl_user_to_inserter[4] | tx_etstamp_ins_ctrl_timestamp_insert |
| ctrl_user_to_inserter[3] | tx_etstamp_ins_ctrl_timestamp_format |
| ctrl_user_to_inserter[2] | tx_etstamp_ins_ctrl_residence_time_update |
| ctrl_user_to_inserter[1] | tx_etstamp_ins_ctrl_checksum_zero |
| ctrl_user_to_inserter[0] | tx_etstamp_ins_ctrl_checksum_correct |

As described above, the architecture of the network interface provided in some implementations is modular. Referring to the network circuitry 16 in the diagram of FIG. 9, the MAC circuitry 92 may be modular with respect to the 1588_calc circuitry (TX) 96A and 96B and the extractor/inserter circuitry 94. For example, if network circuitry 16 with no synchronization mechanism is desired, the MAC circuitry 92 may be used without the 1588_calc circuitry 96A and 96B and without extractor/inserter circuitry 94. Furthermore, due to the modularity, changes in the design of MAC circuitry 92 do not affect the design of 1588_calc circuitry 96A and 96B and vice-versa.

Figure 13:
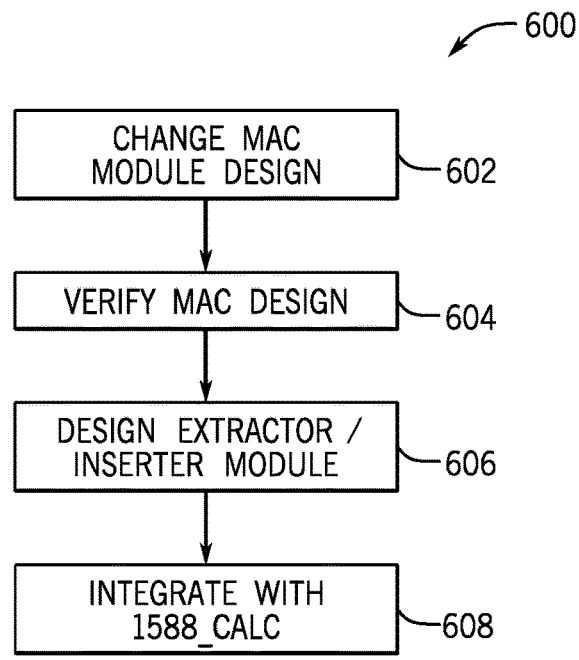
FIG. 13 is a flow chart of a method for modular upgrade of a 3-tier IEEE 1588-compliant MAC interface based on changes to the MAC circuitry, in accordance with an embodiment.

A flowchart in FIG. 13 describes a method 600 to update 3-tier IEEE 1588-compliant network interfaces based on changes to the MAC circuitry. For example, an increase in the desired speed of a network interface may involve changes to the design of its MAC circuitry (block 602). The MAC circuitry may be verified and validated directly (block 604). After proper validation, an extractor/inserter circuitry may be designed (block 606), and a pre-existing 1588_calc circuitry may be integrated in the system. Note that, in some embodiments, no changes to the design of the 1588_calc circuitry may be made. Similarly, a flowchart 650 in FIG. 14 describes a method to update 3-tier IEEE 1588-compliant network interfaces based on changes to the IEEE 1588 standard. If changes to the IEEE 1588 standard occur, the design of the 1588_calc circuitry is also changed (block 652). The new design can be verified and validated independently (block 654). The extractor/inserter circuitry may be accordingly updated (block 656) and the circuitry may be integrated with the MAC circuitry to produce an IEEE 1588-compliant network circuitry (block 658).

Figure 14:
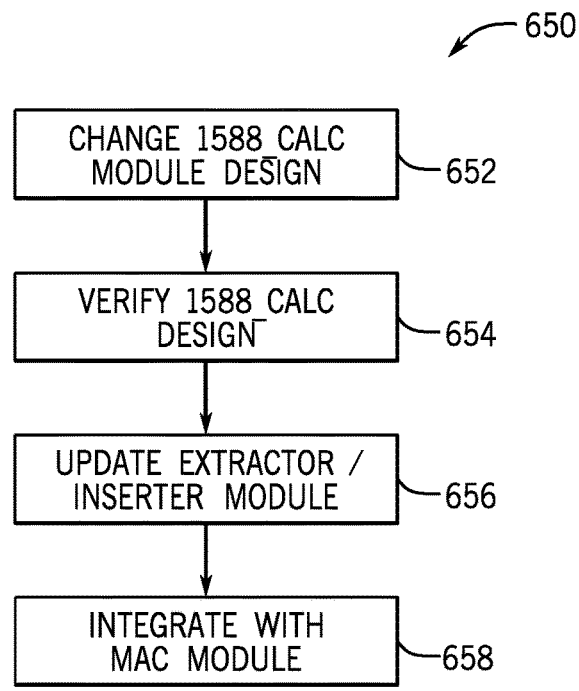
FIG. 14 is a flow chart of a method for modular upgrade of a 3-tier IEEE 1588-compliant MAC interface based on changes to the 1588_calc circuitry, in accordance with an embodiment.

Since developments in the MAC standards and the IEEE 1588 standards are independent, methods 600 of FIG. 13 and 650 of FIG. 14 reduce the amount of redundancies in the design process of an IEEE 1588-compliant network circuitry. Note further that, in some implementations, a previously existing, non-IEEE 1588-compliant network interface may, with connection to 1588_calc circuitry and to extractor/inserter circuitry, be used to produce an IEEE 1588-compliant network interface with minimal change to the MAC circuitry.

Figure 15:
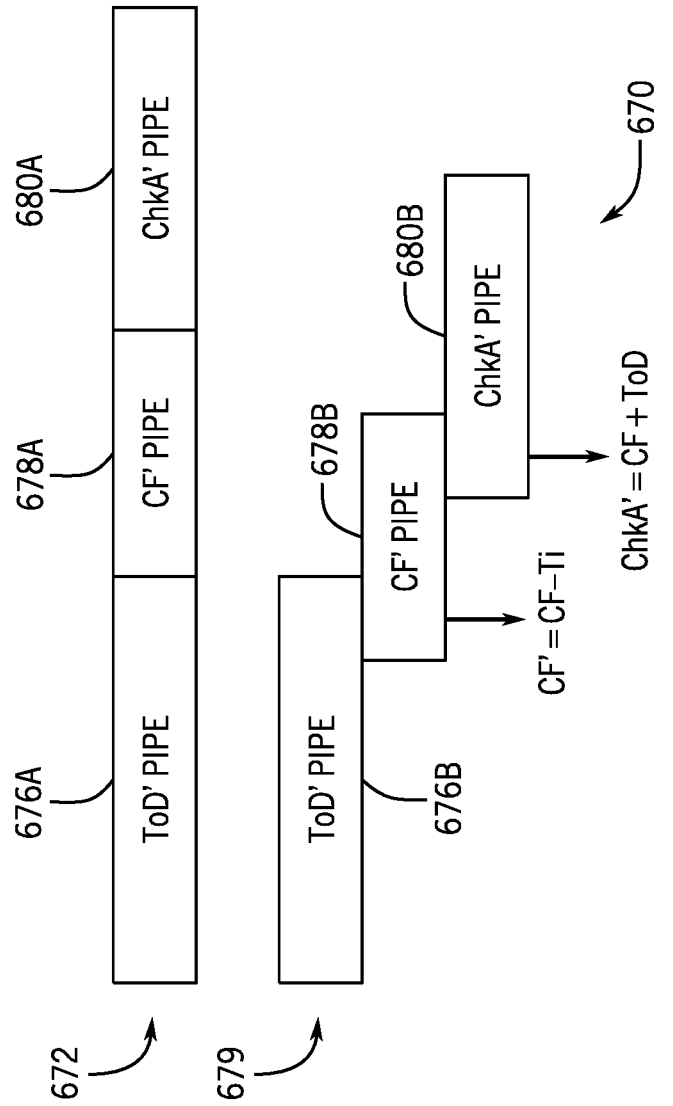
FIG. 15 is a diagram of data pipelines for 1588_calc circuitry, in accordance with an embodiment.

A diagram 670 representing certain operations performed by the data pipeline for the 1588_calc circuitry is illustrated in FIG. 15. In some implementations of the 1588_calc circuitry, a serial pipeline 672 is employed. In this pipeline, operation of the ToD_calc 676A is finished prior to the beginning of operation of the CF_calc 678A. Similarly, the calculation of the checksum ChkA 680A begins after the end of the calculation of the CF 678A. In some implementations, the 1588_calc pipeline latency can be optimized by initiating a process before the end of the previous one, as illustrated in the pipeline 674. The calculation of the CF 678B can start prior to the end of the processing from the ToD 676B. Similarly, the calculation of the checksum ChkA 680B can be initiated prior to the end of the calculation of the CF 678B.

Figure 16:
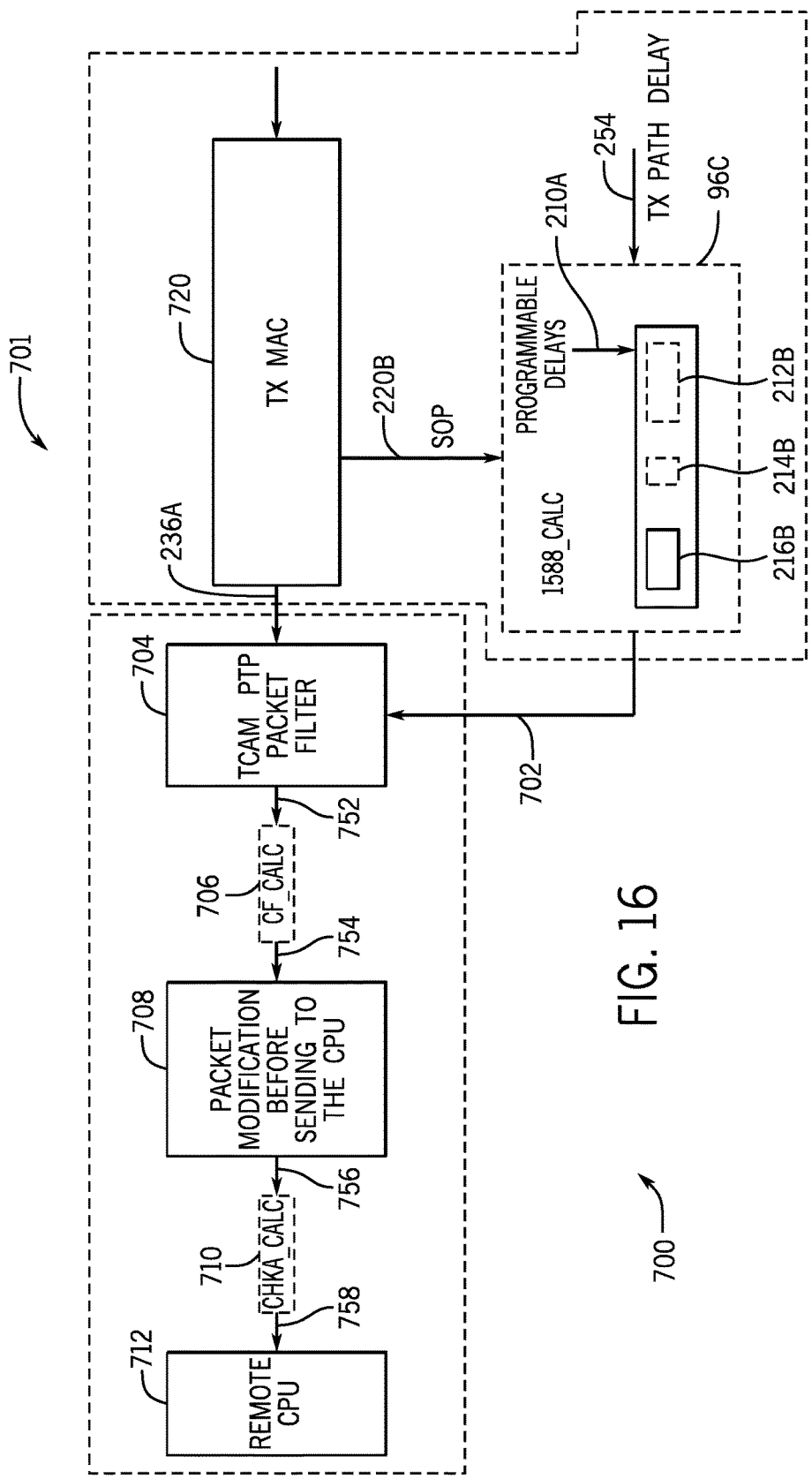
FIG. 16 is a diagram of a modified 3-tier IEEE 1588-compliant MAC interface, in accordance with an embodiment.

The modular architecture of this system allows for relatively easier changes based on application constraints. The diagram of FIG. 16 illustrates a modification in the method for transmission of IEEE 1588-compliant TX packets where the CF and ChkA calculations are performed downstream of the interface 701. In this implementation, the CF_calc 214B and the ChkA_calc 212B components have been removed from 1588_calc (TX) circuitry 96C. Upon the SoP signal 220B, the ToD_calc component 216B may provide an updated ToD 702, without adjusting Correction Fields or calculating a Checksum in the MAC packet. Therefore, Extractor/Inserter circuitry is not used. In this implementation, a TCAM PTP packet filter 704 may check if the MAC packet 228B is a PTP packet and update it with the ToD 702 if it is appropriate. The packet is then modified 708 with an updated Correction Field produced by a custom CF_calc 706 and a checksum is calculated by a custom ChkA_calc 710. The final packet is then send to a remote computer 712 through the network 758.

Figure 17:
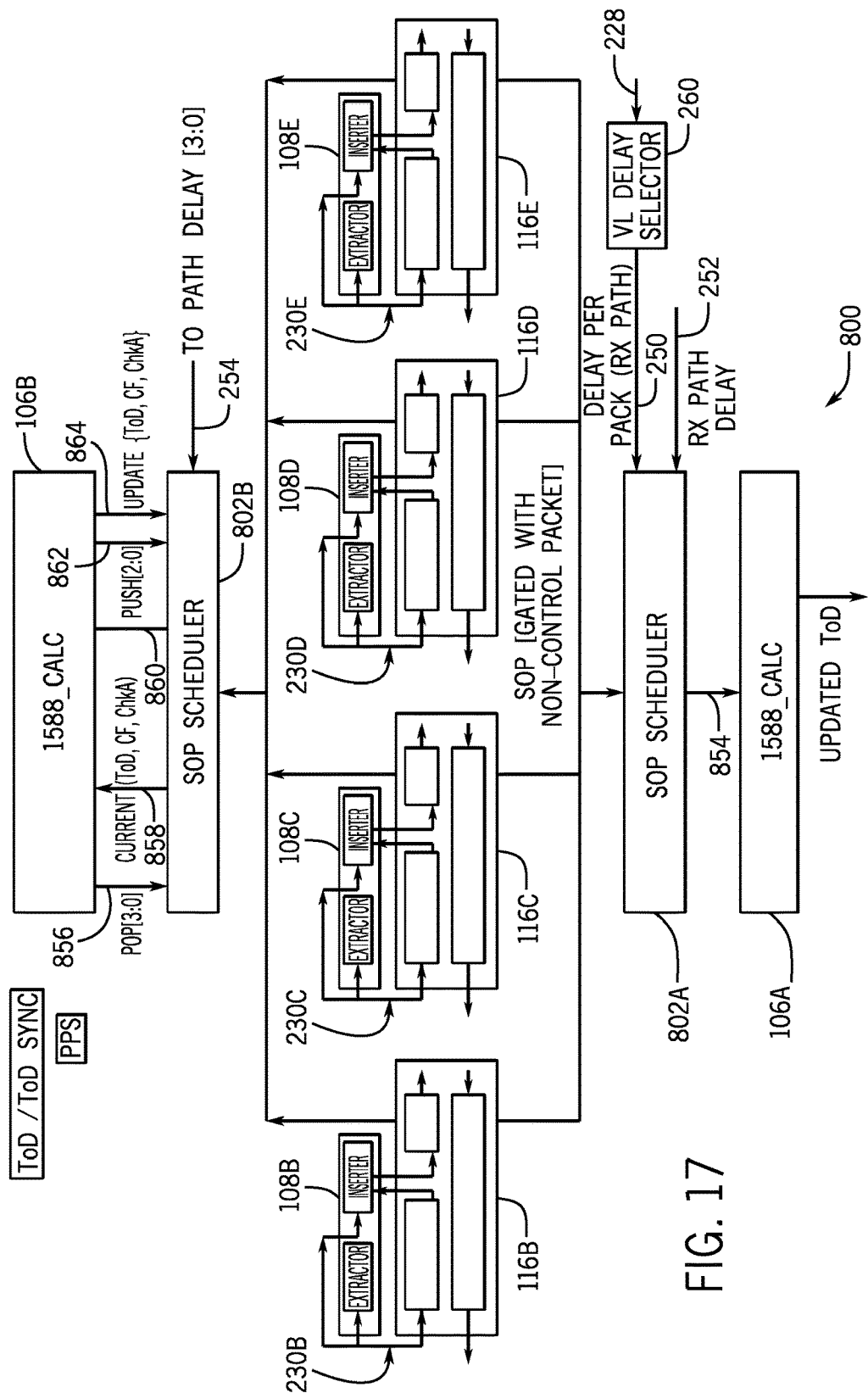
FIG. 17 is a diagram of an array of 3-tier IEEE 1588-compliant MAC interfaces using a single module of 1588_calc circuitry, in accordance with an embodiment.

In another implementation, the modularity of the 3-tier architecture is employed to multiplex the 1588_calc circuitry, as illustrated in FIG. 17. In this system, multiple MAC interfaces 116B-E may share a single module of 1588_calc (TX) circuitry 106B and a single module of 1588_calc (RX) circuitry 106A. In some implementations, each MAC interface, such as 116B, may have its own extractor/inserter circuitry, such as 108B. Furthermore, the 1588_calc (TX) circuitry 106B may be associated with the SoP scheduler 802B and the 1588_calc (RX) 106A may be associated with the SoP Scheduler 802A. The SoP schedulers 802A and 802B may arrange the data corresponding to each MAC interface and ensure that the 1588_calc (TX) circuitry 106B and 1588_calc (RX) circuitry 106A operate on data from a single MAC circuitry unambiguously.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. An electronic device that connects to a common-channel network and complies with a time-synchronization protocol, the electronic device comprising:
   a clock that generates a plurality of timestamps;
   first MAC circuitry that:
      receives an RX MAC packet from the common-channel network using a Media Access Control protocol; and
      sends a TX MAC packet to the common-channel network using the Media Access Control protocol;
   first time-synchronization circuitry separate from the first MAC circuitry, wherein the first time-synchronization circuitry parses the RX MAC packet in accordance with the time-synchronization protocol based at least in part on one of the plurality of timestamps from the clock;
   second time-synchronization circuitry separate from the first MAC circuitry, wherein the second time-synchronization circuitry parses the TX MAC packet and generates time-synchronization data to be inserted in the TX MAC packet in accordance with the time-synchronization protocol based at least in part on one of the plurality of timestamps from the clock and a time-synchronization protocol command of the TX MAC packet; and
   extractor/inserter circuitry coupled between the first MAC circuitry and the second time-synchronization circuitry, wherein the extractor/inserter circuitry:
      extracts a time-synchronization protocol command directed to the second time-synchronization circuitry from the TX MAC packet before the TX MAC packet is sent by the first MAC circuitry;
      provides the time-synchronization protocol command to the second time-synchronization circuitry;
      receives the time-synchronization data from the second time-synchronization circuitry; and
      edits the TX MAC packet in accordance with the time-synchronization protocol to insert the time-synchronization data into the TX MAC before the TX MAC packet is sent by the first MAC circuitry.

2. The electronic device of claim 1, comprising data utilization circuitry that generates and provides the TX MAC packet to the first MAC circuitry and the extractor/inserter circuitry.

3. The electronic device of claim 2, wherein the data utilization circuitry comprises programmable logic fabric of a programmable logic device.

4. The electronic device of claim 3, wherein the programmable logic fabric of the programmable logic device comprises a field programmable gate array fabric.

5. The electronic device of claim 2, wherein the data utilization circuitry generates the time-synchronization command and includes the time-synchronization command in the TX MAC packet that is provided to the first MAC circuitry and the extractor/inserter circuitry.

6. The electronic device of claim 1, wherein the time-synchronization protocol is specified by the IEEE 1588 standard.

7. The electronic device of claim 1, wherein the first MAC circuitry is contained in a first module, the first time-synchronization circuitry is contained in a second module, the second time-synchronization circuitry is contained in a third module, and the extractor/inserter circuitry is contained in a fourth module.

8. The electronic device of claim 1, wherein the extractor/inserter circuitry accommodates a latency of the second time-synchronization circuitry to enable independent operation of the second time-synchronization circuitry from the first MAC circuitry.

9. The electronic device of claim 1, wherein the first time-synchronization circuitry and the second time-synchronization circuitry comprise a shared but symmetrical architecture.

10. The electronic device of claim 1, comprising another first MAC circuitry, wherein the first MAC circuitry and the another first MAC circuitry share access to the first time-synchronization circuitry and the second time-synchronization circuitry.

11. The electronic device of claim 1, wherein the electronic device comprises a network router, switch, or relay, or any combination thereof.

12. Three-tier network circuitry compliant with a time-synchronization protocol, the three-tier network circuitry comprising:
    a first tier that includes MAC circuitry that sends a TX MAC packet;
    a second tier that includes:
        extractor circuitry that parses the TX MAC packet and extracts a time-synchronization command; and
        inserter circuitry that edits the TX MAC packet based at least in part on time-synchronization data, in accordance with the time-synchronization protocol; and
    a third tier that includes first time-synchronization circuitry that generates the time-synchronization data based at least in part on the time-synchronization command.

13. The three-tier network circuitry of claim 12, wherein the first tier, the second tier, and the third tier are modular with respect to one another.

14. The three-tier network circuitry of claim 12, wherein:
    the first tier includes MAC circuitry that receives an RX MAC packet; and
    the third tier includes second time-synchronization circuitry that parses the RX MAC packet in accordance with the time-synchronization protocol.

15. The 3-tier network circuitry of claim 14, wherein the first time-synchronization circuitry and the second time-synchronization circuitry employ a symmetrical circuit design.

16. The 3-tier network circuitry of claim 14, wherein the MAC circuitry provides a "Start of Packet" signal to the first time-synchronization circuitry and to the second time-synchronization circuitry to account for latency due to variations in circuit timing between the first tier and the third tier.

17. The 3-tier network circuitry of claim 12, wherein the MAC circuitry is connected to the inserter circuitry via a first data tap in the MAC circuitry that directs data out to the inserter circuitry and a second data tap in the MAC circuitry that directs data into the MAC circuitry from the inserter circuitry.

18. The 3-tier network circuitry of claim 12, wherein the MAC circuitry complies with the IEEE 802.3 standard.

19. The 3-tier network circuitry of claim 12, wherein the first time-synchronization circuitry complies with the IEEE 1588 standard.

20. A method comprising:
    generating media access control (MAC) outgoing packet using data utilization circuitry that includes an IEEE 1588 command compliant with the IEEE 1588 standard;
    providing the MAC outgoing packet from the data utilization circuitry to first modular circuitry that includes MAC circuitry compliant with the IEEE 802.3 standard and second modular circuitry that includes extractor circuitry and inserter circuitry, wherein the first modular circuitry is distinct from the second modular circuitry;
    using the extractor circuitry of the second modular circuitry to extract the IEEE 1588 command from the MAC outgoing packet;
    providing the IEEE 1588 command from the second modular circuitry to third modular circuitry that includes IEEE 1588 calculation circuitry compliant with the IEEE 1588 standard, wherein the third modular circuitry is distinct from the first modular circuitry and the second modular circuitry;
    using the third modular circuitry to generate time-synchronization data based at least on the IEEE 1588 command;
    providing the time-synchronization data from the third modular circuitry to the second modular circuitry;
    providing the MAC outgoing packet from the first modular circuitry to the inserter circuitry of the second modular circuitry; and
    using the inserter circuitry of the second modular circuitry to edit the MAC outgoing packet based at least in part on the time-synchronization data;
    providing the edited MAC outgoing packet from the inserter circuitry of the second modular circuitry to the first modular circuitry; and
    sending the edited MAC outgoing packet using the first modular circuitry.

* * * * *